US008988662B1

(12) United States Patent
Haskin et al.

(10) Patent No.: US 8,988,662 B1
(45) Date of Patent: Mar. 24, 2015

(54) TIME-OF-FLIGHT CALCULATIONS USING A SHARED LIGHT SOURCE

(71) Applicant: Rawles LLC, Wilmington, DE (US)

(72) Inventors: Menashe Haskin, Palo Alto, CA (US); William Thomas Weatherford, San Mateo, CA (US); Edward Dietz Crump, Santa Cruz, CA (US)

(73) Assignee: Rawles LLC, Wilmington, DE (US)

( * ) Notice: Subject to any disclaimer, the term of this patent is extended or adjusted under 35 U.S.C. 154(b) by 0 days.

(21) Appl. No.: 13/632,570

(22) Filed: Oct. 1, 2012

(51) Int. Cl.
*G01C 3/08* (2006.01)

(52) U.S. Cl.
CPC .......................................... *G01C 3/08* (2013.01)
USPC ....... 356/5.01; 356/3.01; 356/4.01; 356/5.09; 356/9; 356/28.5

(58) Field of Classification Search
USPC ................. 356/3.01, 4.01, 5.01, 5.09, 9, 28.5
See application file for complete search history.

(56) References Cited

U.S. PATENT DOCUMENTS

| | | | |
|---|---|---|---|
| 4,274,288 A * | 6/1981 | Tittmann et al. ................. 73/602 |
| 7,418,392 B1 | 8/2008 | Mozer et al. | |
| 7,525,116 B2 * | 4/2009 | Suzuki .......................... 250/588 |
| 7,720,683 B1 | 5/2010 | Vermeulen et al. | |
| 7,774,204 B2 | 8/2010 | Mozer et al. | |
| 7,845,878 B1 * | 12/2010 | Godbersen et al. ............. 404/72 |
| 8,542,276 B2 * | 9/2013 | Huang et al. ................... 348/152 |
| 2003/0163287 A1 * | 8/2003 | Vock et al. ..................... 702/187 |
| 2004/0066499 A1 * | 4/2004 | Rheme et al. ................. 356/3.01 |
| 2005/0089069 A1 * | 4/2005 | Ozasa et al. ..................... 372/26 |
| 2007/0287091 A1 * | 12/2007 | Jacobo et al. ................. 430/154 |
| 2012/0223885 A1 | 9/2012 | Perez | |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Isam Alsomiri
*Assistant Examiner* — Samantha K Abraham
(74) *Attorney, Agent, or Firm* — Lee & Hayes, PLLC

(57) ABSTRACT

In some embodiments, distances associated with a surface may be calculated using time-of-flight (ToF) of a plurality of pulses of light occurring at a predetermined frequency. Reflected light from a light emitter may be captured by two or more light sensors. At least one light sensor may be located in a sensor pod that is separate from the light emitter, which may be housed in an emitter pod with or without a light sensor. The sensor pod may be synchronized with the emitter pod to enable ToF of light distance calculations. The calculated distance may be used to determine movement of a surface and/or one or more pixels of a surface. In some instances, the calculated distance may be used to identify a profile of a surface, which may then be used associate the profile with an object, a command, or another association.

27 Claims, 14 Drawing Sheets

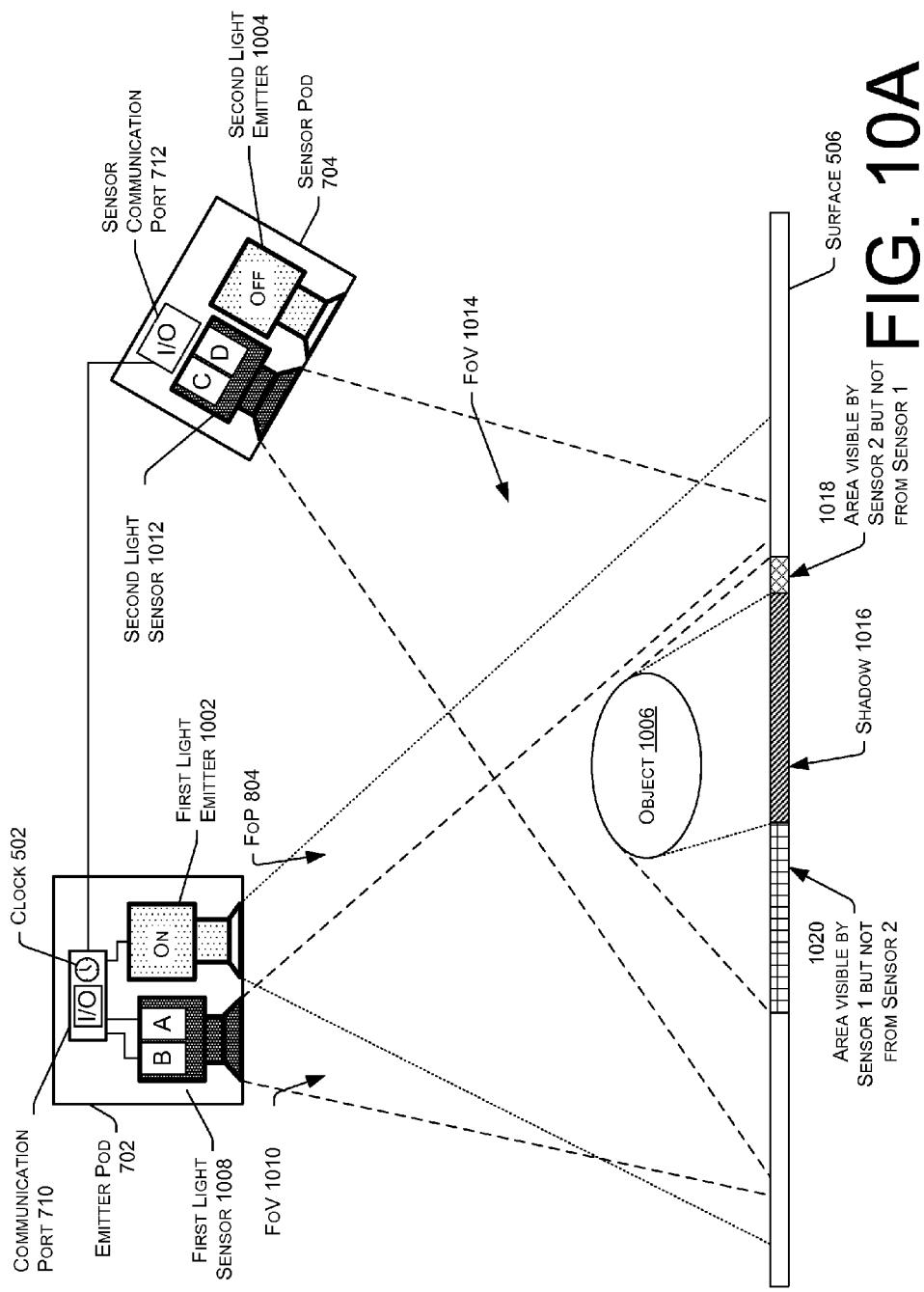

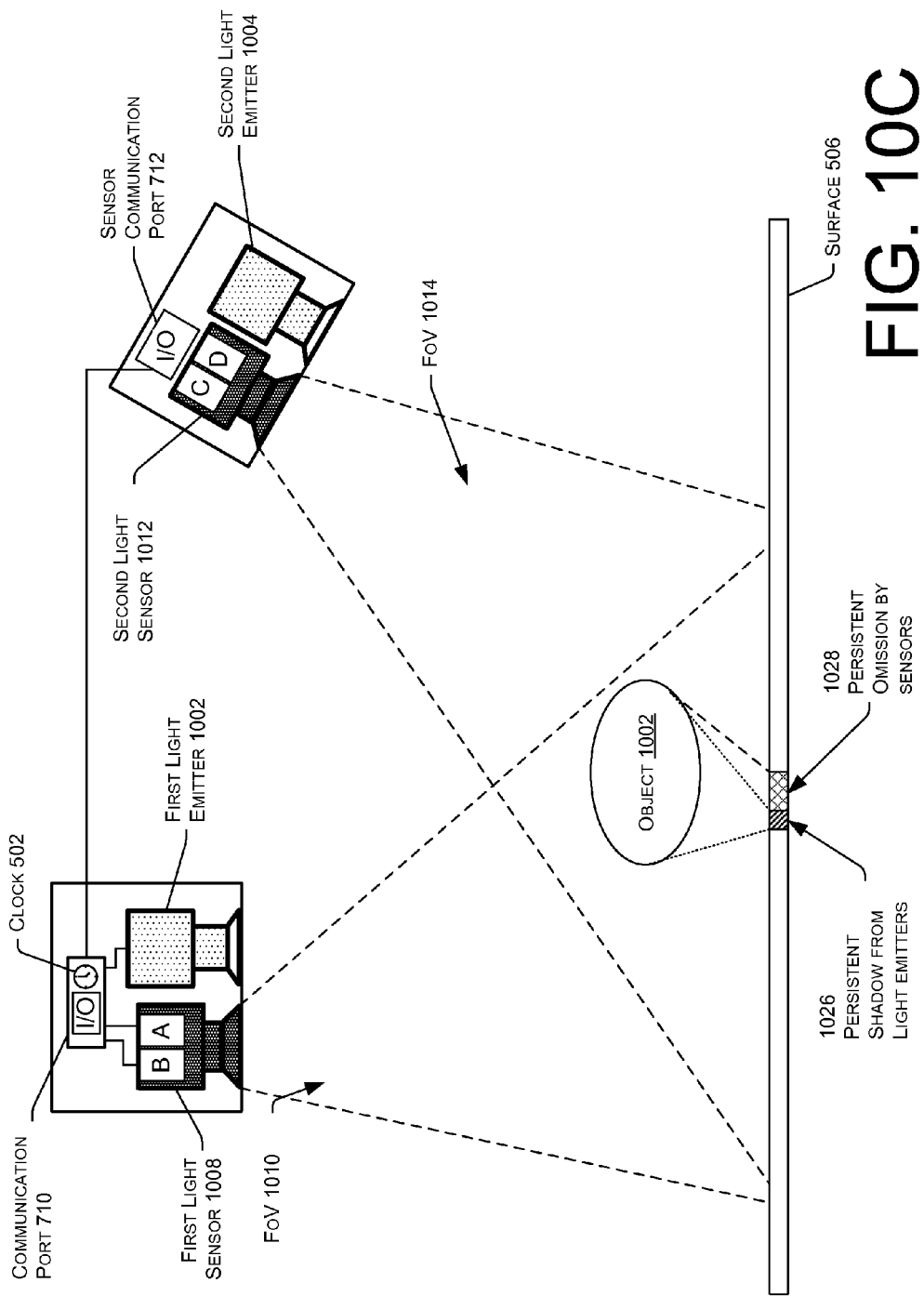

TIME-OF-FLIGHT CALCULATIONS USING A SHARED LIGHT SOURCE

BACKGROUND

A distance between objects can be measured by emitting light and measuring a time-of-flight of the light between the objects. Traditional measurement of light using time-of-flight uses light and calculates a distance based on the amount of time between the emission of the light and a time when the light is captured at a sensor. Typically, the sensor is located near a light emitter that emits the light.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 10A-C illustrate use of the sensor pod(s) to provide ToF calculations of objects from various perspectives.

DETAILED DESCRIPTION

Described herein are systems and techniques to determine a distance associated with a surface using time-of-flight (ToF) of a plurality of pulses of light occurring at a predetermined frequency. The systems and techniques may use data from two or more light sensors which capture light from a same light emitter. At least one light sensor may be located in a sensor pod (or unit) that is separate from the light emitter that is currently emitting light. The separate light sensor(s) may be housed in the sensor pod with or without a currently active light emitter. The sensor pod may be synchronized with an emitter pod (or unit), which that contains the light emitter that is currently emitting light, to enable ToF of light distance calculations using light emitted from the light emitter.

In some embodiments, a field-of-view (FoV) of the light sensors may overlap, which may enable removal of noise (e.g., outlier data) from data collected from the overlap area. In some instances, collection of data from the overlap area may enable higher resolution calculations of distances and/or depth calculations for surfaces, such as surfaces of an object.

The calculated distance may be used to determine movement of a surface and/or one or more pixels that correspond to locations of a surface. In some instances, the calculated distance may be used to identify a profile of a surface, which may then be used associate the profile with an object, a command, or another association.

The systems and techniques described herein may be implemented in a number of ways. Example implementations are provided below with reference to the following figures.

Figure 1:
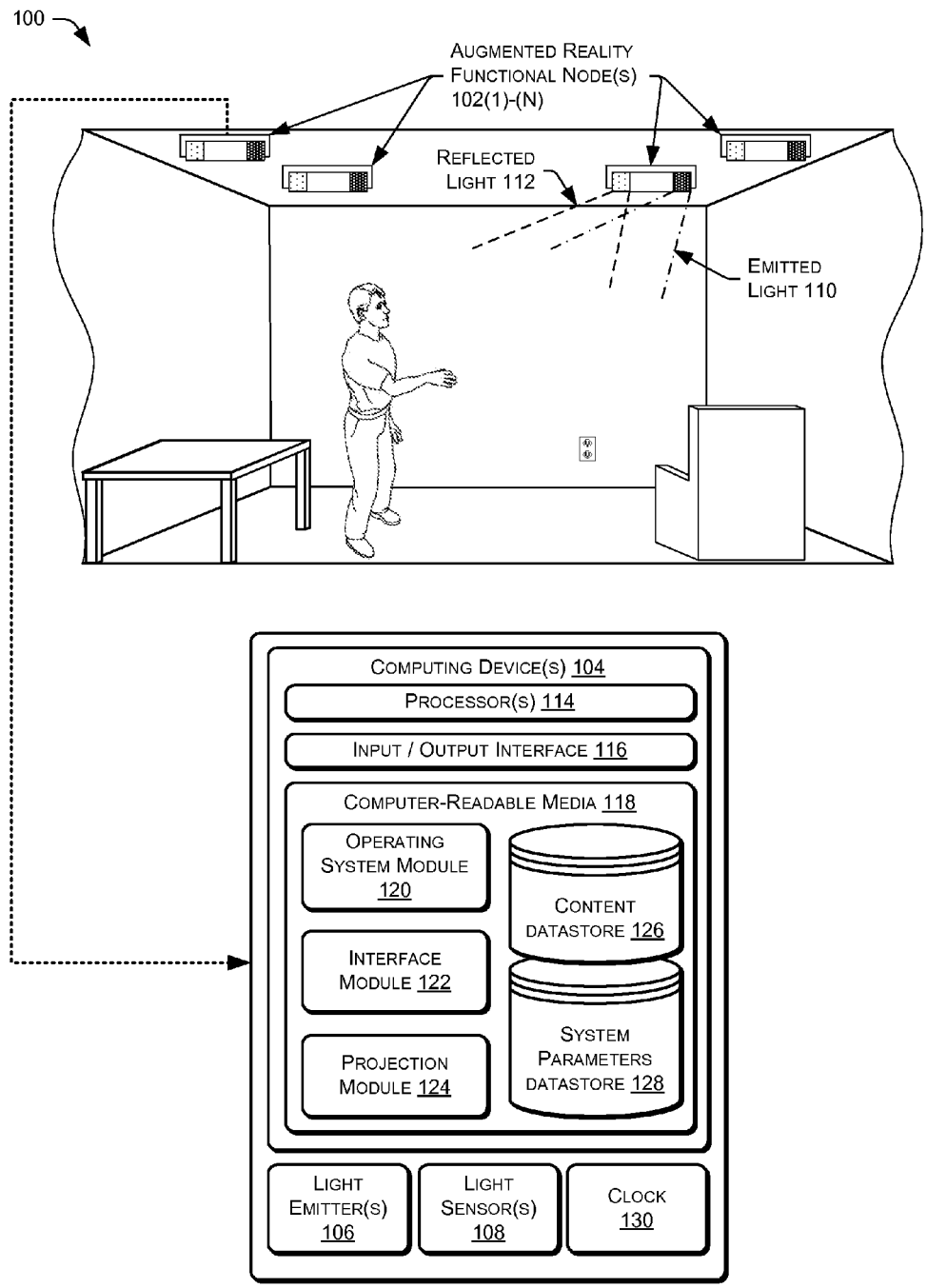
FIG. 1 illustrates an environment that includes an augmented reality functional node (ARFN) and a user that may interact with the ARFN.

FIG. 1 shows an illustrative augmented reality environment 100 in which the described techniques may be performed. The environment 100 includes one or more augmented reality functional nodes (ARFNs) 102(1), . . . , 102(N) (collectively referred to as "the ARFN 102" in some instances). While the environment illustrates four nodes, in some instances an environment may include any number of one or more nodes stationed in different locations throughout the environment. Furthermore, it is to be appreciated that the techniques described herein may be performed by a single ARFN, by a collection of any number of ARFNs, or by any other devices or combinations of devices.

As illustrated, each ARFN 102 may include one or more computing devices 104, as well as one or more light emitters 106 that, when active, emit light onto any surface within the environment 100.

In some embodiments, the light emitter(s) 106 may include one or more projectors that project content onto any surface. The projected content may include electronic books, videos, images, interactive menus, or any other sort of visual content.

For instance, a user within the environment may request that the ARFN 102 project a particular electronic book that the user wishes to read. In response, the ARFN 102 may project the book onto a projection surface within the environment. In another example, the user may request that the ARFN 102 project a particular movie or show that the user wishes to watch. In response, the ARFN 102 may obtain the content (locally or remotely) and may project the content onto a surface in the environment. In yet another example, the ARFN 102 may be configured to project a user interface (UI), such as a keyboard, a slider bar, a virtual remote control to operate a television within the environment 100, or any other type of UI.

As discussed in further detail below, the ARFN 102 may include one or more light sensor(s) 108 that may capture light that is emitted from the light emitter(s) 106 and reflected off a surface.

In some embodiments, the light sensor(s) may be used to determine movement of surfaces, such as movement of user operating the UI. In response, the ARFN 102 may provide feedback to the user and/or may cause performance of actions corresponding to the user's operation of the UI. For instance, when the ARFN 102 projects a remote control, the ARFN 102 may provide feedback to the user indicating which button(s) a user is in position to select, may identify a user's selection (e.g., a selection to power on the television) and, in response, may operate the television according to an identified selection. While a few examples have been given, it is to be appreciated that the ARFN 102 may project any other sort of content within the environment 100. In addition, the ARFN 102 may recognize and interpret gestures that are made by the user without reference to a UI projected within the environment. In addition, the ARFN 102 may recognize and interpret gestures that are made by the user, and based on the gestures, generate a UI (e.g., a virtual UI) projected within the environment.

In this example, one of the ARFNs 102 within the environment is shown to provide emitted light 110 as pulses of light. In addition, the ARFN may capture reflected light 112 within the environment for the purpose of identifying distances between the ARFN and a surface that reflects the light.

While FIG. 1 illustrates one ARFN emitting the emitted light 110 and receiving the reflected light 112, in some implementations, one or more other ARFNs may additionally or alternatively perform one or both of these functions. In either instance, by scanning the environment in this manner, the ARFNs 102 may identify the location (e.g., distances) of objects within an environment and movement of the objects. In some instances, the objects may be people and the movements may be gestures performed by people within the environment. Such gestures may be interpreted as instructions or commands to be implemented by the ARFNs 102.

As illustrated, the computing device 104 of the example ARFN 102 includes one or more processors 114, an input/output interface 116, and computer-readable media 118. The processors 114 may be configured to execute instructions, which may be stored in the computer-readable media 118 or in other computer-readable media accessible to the processors 114.

Figure 2:
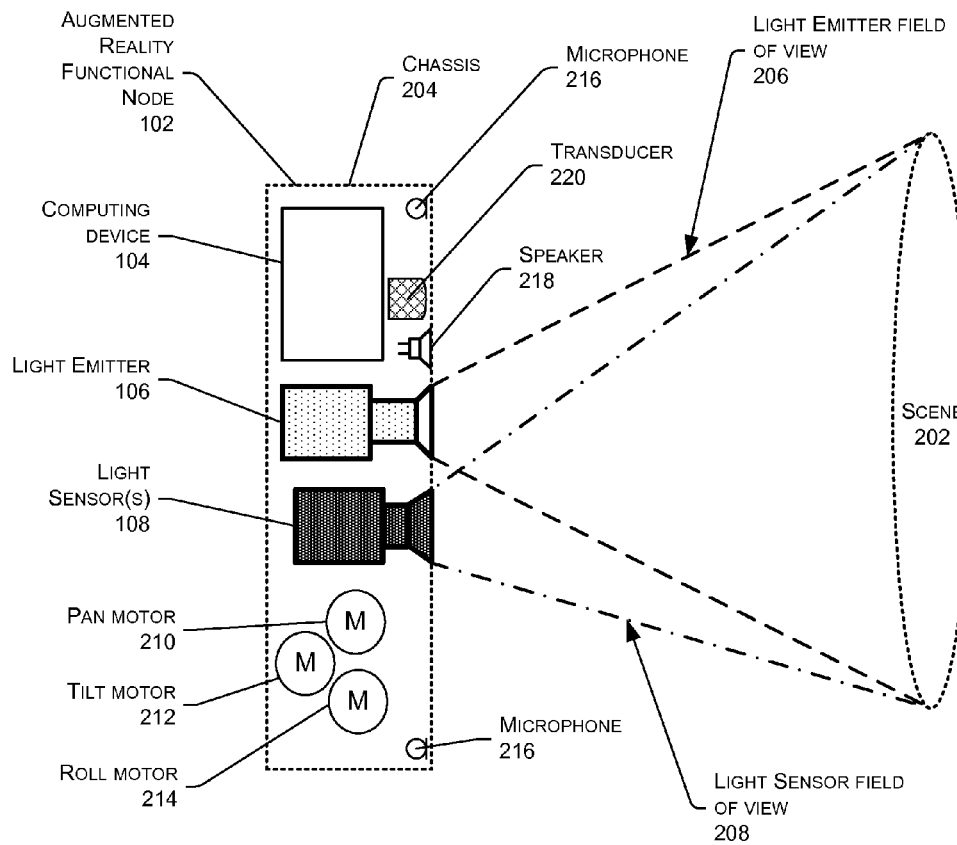
FIG. 2 illustrates an example ARFN that includes a computing device, a light emitter, light sensor(s), and other selected components for allowing a user to interact with the ARFN.

The input/output interface 116, meanwhile, may be configured to couple the computing device 104 to other components of the ARFN 102, such as the light emitter 106, the light sensor 108, microphones, other ARFNs 102, other computing devices, and so forth. The coupling between the computing device 104 and the devices may be via wire, fiber optic cable, wireless connection, or the like. Furthermore, while FIG. 1 illustrates the computing device 104 as residing within a housing of the ARFN 102, some or all of the components of the computing device 104 may reside at another location that is operatively connected to the ARFN 102. In still other instances, certain components, logic, and/or the like of the computing device 104 may reside within the light emitter 106 or the light sensor 108. Therefore, it is to be appreciated that the illustration of the ARFN 102 of both FIGS. 1 and 2 is for illustrative purposes only, and that components of the ARFN 102 may be configured in any other combination and at any other location.

The computer-readable media 118, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device 104. The computer-readable media 118 may reside within a housing of the ARFN, on one or more storage devices accessible on a local network, on cloud storage accessible via a wide area network, or in any other accessible location.

The computer-readable media 118 may store several modules, such as instructions, datastores, and so forth that are configured to execute on the processors 114. For instance, the computer-readable media 118 may store an operating system module 120, an interface module 122, a projection module 124, a content datastore 126, and a system parameters datastore 128.

The operating system module 120 may be configured to manage hardware and services within and coupled to the computing device 104 for the benefit of other modules. The interface module 122, meanwhile, may be configured to receive and interpret commands received from users within the environment 100. For instance, the interface module 122 may analyze and parse data captured by the light sensors 108 to identify hand gestures made by users within the environment 100. In response to identifying a predefined gesture, the interface module 122 may interpret the gesture and cause the ARFN 102 to perform a corresponding action.

For instance, if a user within the environment 100 makes a gesture requesting that the ARFN 102 project a certain piece of content, then the interface module 122 may interpret the gesture and cause the projection module 124 to project the content via the light emitter 106.

The content datastore 126, meanwhile, stores content for outputting within the environment. For instance, the content datastore may store applications and data for use within the environment 100. The projection module 124 may access the content datastore 126 in order to project requested content within the environment 100. For instance, when the user requests that the ARFN 102 project a particular electronic book, the projection module 124 may access the content datastore 126 to retrieve and cause projection of the desired electronic book.

The computer-readable media 118 may store the system parameters datastore 128, which is configured to maintain information about the state of the computing device 104, the light emitter 106, the light sensor 108, and so forth. For example, and as described in detail below, the ARFN 102 may be configured to pan and tilt for the purpose of allowing the light emitter 106 and the light sensor 108 to access different projection surfaces in the environment 100. As such, the system parameters maintained in the datastore 128 may include current pan and tilt settings of the camera and projector, an indication of content that the ARFN 102 is currently projecting or otherwise outputting, and the like.

The system parameter datastore 128 (or another datastore) may further store a library of reference gestures that may be used to interpret user gestures. As illustrated, the user in the room may make gestures with his body, such as hand motions, that can be captured by the cameras. The computing device identifies motion parameters corresponding to the observed gesture. The motion parameters are compared to those of the gesture library. The device then classifies the observed gesture based on the comparison.

In some embodiments, the computing device 104 may include a clock 130 to generate a clock cycle. The clock cycle may be used by the light emitters 106 and/or the light sensors 108 to control operation of the respective devices during time-of-flight of light measurements as discussed in greater detail below. In some instances, the clock 130 may be integrated with the processor(s) 114, one or more of the light emitter(s), 106, or another device.

FIG. 2 shows additional details of an example ARFN 102 that may be configured to measure distances of surfaces, identify movement of the surfaces (or objects), project a user interface (UI), and/or to identify and respond to user gestures, as described above with reference to FIG. 1. The ARFN 102 is configured to scan at least a portion of a scene 202 and the objects therein. The ARFN 102 may also be configured to provide output, such as images, sounds, and so forth.

A chassis 204 holds the components of the ARFN 102. One or more light emitters 106 may be disposed within the chassis 204 and may be configured to generate and project light and/or images into the scene 202. The light may include visible light, non-visible light, or both. The images may be visible light images perceptible to the user, visible light images imperceptible to the user, images with non-visible light, or a combination thereof. The light emitter 106 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The light emitter 106 may have a light emitter field of view 206 which describes a particular solid angle. The light emitter field of view 206 may vary according to changes in the configuration of the light emitter 106. For example, the light emitter field of view 206 may narrow upon application of an optical zoom to the light emitter 106. The light emitter field of view 206 may result in emission of light over a small surface area or a larger surface area.

One or more light sensors 108 may also be disposed within the chassis 204. The light sensors 108 are configured to receive light emitted by the light emitter 106 and reflected off a surface in the scene 202. Thus, the light sensors 108 receive reflected light. The light sensors 108 have a light sensor field of view 208 that describes a particular solid angle. The light sensor field of view 208 may vary according to changes in the configuration of the light sensor(s) 108. For example, an optical lens included with one of the light sensors may narrow the light sensor field of view 208. The light sensor field of view 206 may result in capture of light from a small surface area or a larger surface area, and may align with the light emitter field of view 206.

In some implementations, a plurality of light sensors 108 may be used where each light sensor includes a photodiode and a storage element. In some embodiments, a light sensor may be equipped a photodiode that is shared by a plurality of storage elements (e.g., capacitors), which each store energy during intervals of time. These storage elements may be used to create data that indicates a distance of an object or surface in the scene 202, as explained in further detail below regarding discussion of time-of-flight of light.

The chassis 204 may be mounted with a fixed orientation, or may be coupled via an actuator to a fixture such that the chassis 204 may move. Actuators may include piezoelectric actuators, motors, linear actuators, and other devices configured to displace or move the chassis 204 or components therein such as the light emitter(s) 106 and/or the light sensor(s) 108. For example, in one implementation the actuator may comprise a pan motor 210, a tilt motor 212, a roll motor 214, and so forth. The pan motor 210 is configured to rotate the chassis 204 in a yawing motion. The tilt motor 212, meanwhile, is configured to change the pitch of the chassis 204. The roll motor 214 is configured to move the chassis 204 in a rolling motion. By panning, tilting, and/or rolling the chassis 204, different views of the scene may be acquired.

One or more microphones 216 may be disposed within the chassis 204, or elsewhere within the scene 202. These microphones 216 may be used to acquire input from the user, may be used to determine the location of a sound, or may be used to otherwise aid in the characterization of and receipt of input from the scene. For example, the user may make a particular noise, such as a tap on a wall or snap of the fingers, which are pre-designated as attention command inputs. The user may alternatively use voice commands. Such audio inputs may be located within the scene using time-of-arrival differences among the microphones and used to summon an active zone within the augmented reality environment.

One or more speakers 218 may also be present to provide for audible output. For example, the speakers 218 may be used to provide output from a text-to-speech module or to playback pre-recorded audio.

A transducer 220 may also reside within the ARFN 102, or elsewhere within the environment, and may be configured to detect and/or generate inaudible signals, such as infrasound or ultrasound. These inaudible signals may be used to provide for signaling between accessory devices and the ARFN 102.

In this illustration, the computing device 104 is shown within the chassis 204. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof. In still other instances, the ARFN 102 may couple to and control other devices within the environment, such as televisions, stereo systems, lights, and the like.

In other implementations, the components of the ARFN 102 may be distributed in one or more locations within the environment 100. As mentioned above, microphones 216 and speakers 218 may be distributed throughout the scene. The light emitter 106 and the light sensor 108 may also be located in separate chasses 204. The ARFN 102 may also include discrete portable signaling devices used by users to issue command attention inputs. For example, these may be acoustic clickers (audible or ultrasonic), electronic signaling devices such as infrared emitters, radio transmitters, and so forth.

Figure 3:
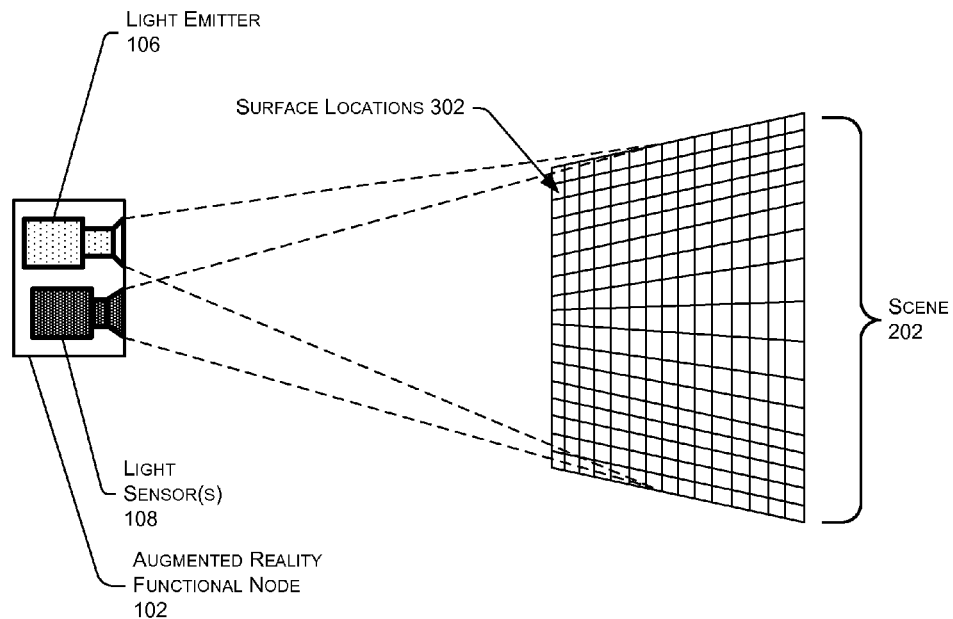
FIG. 3 is an illustrative diagram of the ARFN using a light emitter and time-of-flight (ToF) light sensors to identify surfaces, objects, and user interactions within an environment. By identifying user interactions, the ARFN is able to determine when a user is requesting that the ARFN perform a specified action.

FIG. 3 is an illustrative diagram of the ARFN 102 using time-of-flight (TOF) information to determine location and distance information regarding users, user hands, and other objects within an environment. However, while the techniques described herein provide one example for obtaining distance information regarding these objects, it is to be appreciated that distance information may be determined in other manners in other embodiments. In addition, the distance information may be used to determine three-dimensional (3D) information about objects.

In the instant illustration, the light emitter 106 emits pulses of light onto the scene 202. The pulses of light may be synchronized with a clock cycle from the clock 130 and include time intervals of "on" and "off", which can be represented by a square wave or other type of wave. The pulses of light may be emitted in wavelengths that are visible to the user, non-visible to the user, or a combination thereof.

The light sensors 108 may be used to receive the emitted light after the light is reflected off objects or surfaces in the scene 202. The light sensors 108 may measure reflected light at specific surface locations 302 to determine a distance of objects or surfaces in the scene 202. For example, a pair of sensors may be used to measure the distance of a surface of a plurality of surface locations that reflect light. The surface locations 302 may be mapped over a wall, over objects (including people), or over any other surface included in an environment. The light sensors 108 may include elements to store measured light for each of the surface locations 302. Thus, the light sensors 108 may store a pixilated view of the surface locations, which may later be used to reproduce information about the scene 202.

The surface locations 302 may be represented as a grid for ease of illustration and not as a limitation. In other implementations other patterns, such as bars, dots, and so forth may be used. For example, the scene 202 may be analyzed as the plurality of surface locations 302 in a grid of [A×B] size, where the number of surface locations 302 is the product of A and B. For example, if the grid is [320×240], then the number of surface locations 302 is 76,800. Thus, in the example above, each of the 76,800 surface locations may be sensed by respective pairs of light sensors, thus 153,600 light sensors may be used in this example when two light sensors are used for each surface location. Other quantities of light sensors may also be used. The light sensors 108 may be formed on one or more silicon chips. For example, the light sensors 108 may be implemented as capacitors that store energy associated with an amount of light received from a respective surface location during a predetermined amount of time.

Figure 4:
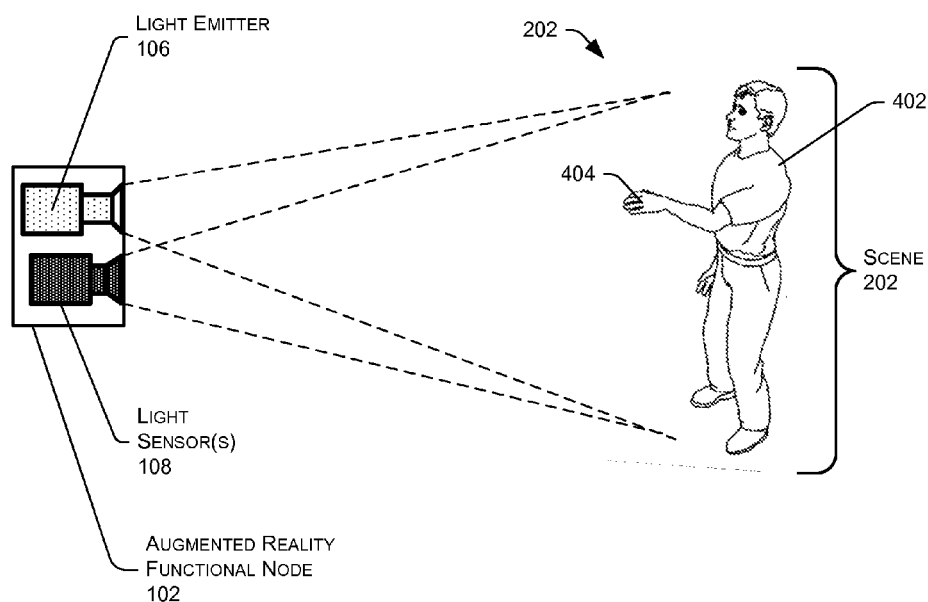
FIG. 4 is an illustrative diagram of the ARFN detecting the pose of a person within an environment.

FIG. 4 is an illustrative diagram of the ARFN 102 detecting the pose of a person within an environment. As discussed above, the light sensors 108 detect the light reflected from surfaces within the scene 202. The light sensors 108 may provide data that enables identification of a user 402 and/or other objects within the environment. In some instances, this information may be utilized to identify user gestures and trajectories of these gestures, such as a trajectory of a hand 404 of the user 402 or other body part of the user 402. The light sensors 108 may also provide data that can be used to identify a location of a selection tool (e.g., a user's finger) as this location changes over time. The ARFN 102 may then use these locations tracked over time to identify a trajectory of the gesture.

FIGS. 5A-5D illustrate techniques to perform TOF calculations by capturing light emitted by a light emitter and reflected off a surface. The captured light is used to determine a distance from the surface.

Figure 5A:
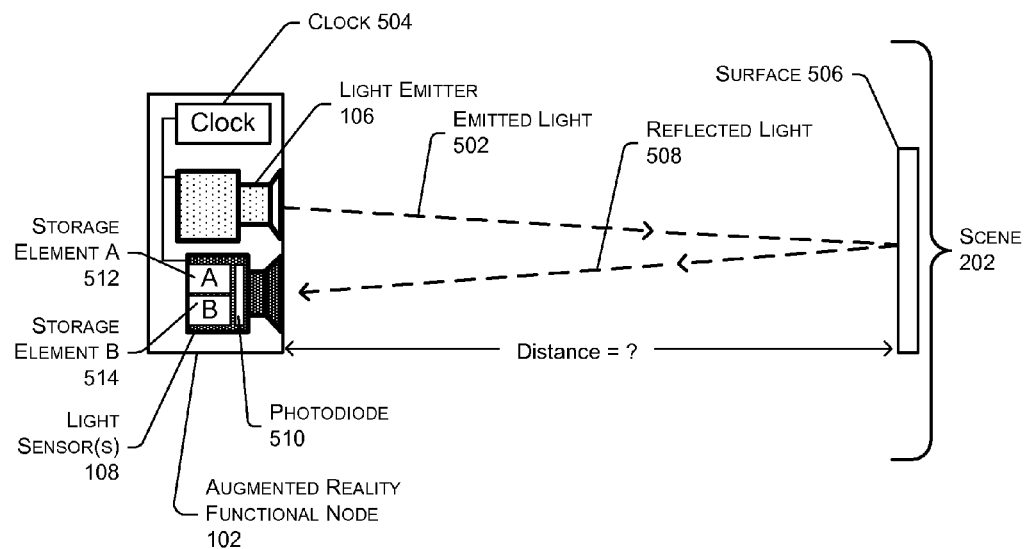
FIGS. 5A-5D illustrate basic techniques to perform TOF calculations by capturing light emitted by a light emitter and reflected off a surface. The captured light is used to determine a distance from the surface.

FIG. 5A shows the light emitter 106 that emits light (emitted light 502) projected in a direction toward the scene 202. The emitted light 502 is generated by pulsing light on and off by the light emitter 106 based on a clock cycle from a clock 504. The pulses of light may be represented by a square wave, which is shown and discussed with reference to FIG. 5B. However, other pulses patterns may be employed that do not include equal lengths of time (e.g., emit light for 0.25 μs every 1 μs, etc.) Meanwhile, the emitted light 502 may be reflected off a surface 506, such as off an object, a person, clothing, tools, and so forth. Reflected light 508 may travel back toward the light sensor(s) 108.

In accordance with one or more embodiments, the light sensor(s) 108 may include a photodiode 510, a storage element A 512 and a storage element B 514. In these embodiments, the photodiode 510 may be shared by multiple storage elements. However, some configurations may include a separate photodiode for each storage element. For the sake of the following discussion (and through this document), either configuration may be used. The storage elements A and B may store energy from the reflected light 508 captured by the photodiode at different intervals of time. For example, the storage element A 512 may cycle on at a first time and off at a second time while the storage element B 514 may cycle off at the first time and on at the second time in opposite alternation (inverse synchronization) with the storage element A 512. In some embodiments, additional storage element may be used in addition to the storage element A 512 and the storage element B 514, which may store energy from light at different intervals and/or overlapping intervals. The storage elements 512 and 514 may be capacitors or other hardware used to store energy converted from light. At some points, the discussion below may refer to a capture of light from different light sensors, however, it shall be understood that a light sensor with a shared photodiode can capture different time intervals of light using multiple storage elements, and thus may perform the function of multiple sensors.

Figure 5B:
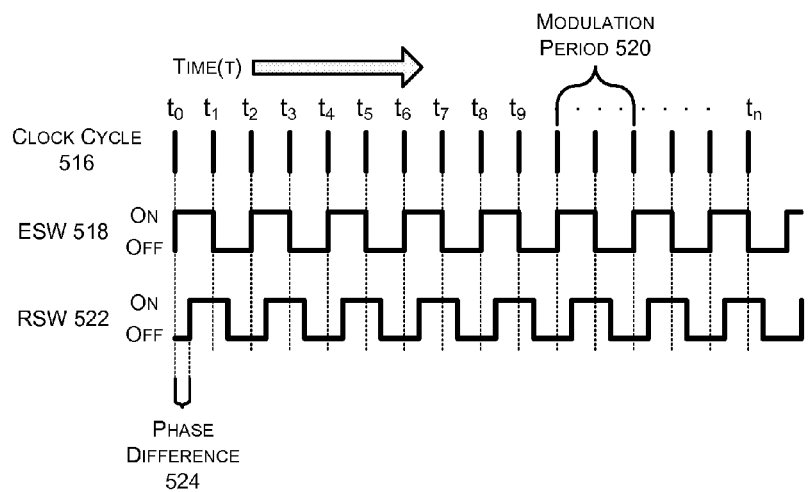

FIG. 5B shows a clock cycle 516 plotted with respect to time (t). The clock cycle 516 may be generated by the clock 504 and include equal segments of time based on a predetermined frequency. In addition, FIG. 5B shows an emitter square wave (ESW) 518 that represents a graph of the pulsing of light by the light emitter 106 between an on-state of operation and an off-state of operation. Although the various waves discussed herein are referred to as square waves, other types of waveforms may be employed to accomplish the same or similar results. In various embodiments, the on-state and the off-state may be equal in length of time and synchronized to operate during the time intervals provided by the clock cycle 516. For example, the light emitter 106 may emit light for x clock cycles and then be off for x clock cycles until emitting light again for x clock cycles, and so forth. A modulation period 520 is defined by each complete cycle of the light emitter 106 operating the on-state and the off-state once. In the example above, the modulation period 520 is 2x.

FIG. 5B also shows a received square wave (RSW) 522 that represents a graph of the received pulses of the reflected light 508 as captured (stored, measured) by the light sensor 108. The RSW 522 shows when light is received (on) or not received (off), which is a function of the pulses of light generated by the light emitter 106. Unlike the ESW 518, the RSW 522 may not be synchronized with the clock cycle. A difference in the timing of the transitions of light (e.g., pulses) and the clock cycle is equal to a phase difference 524, which is shown in FIG. 5B, and dependent on a distance of travel of the reflected light 508. The phase difference may be used to determine a distance between the ARFN 102 and the surface 506. The use of the phase difference 524 is explained in further detail with reference to FIGS. 5C and 5D.

Figure 5C:
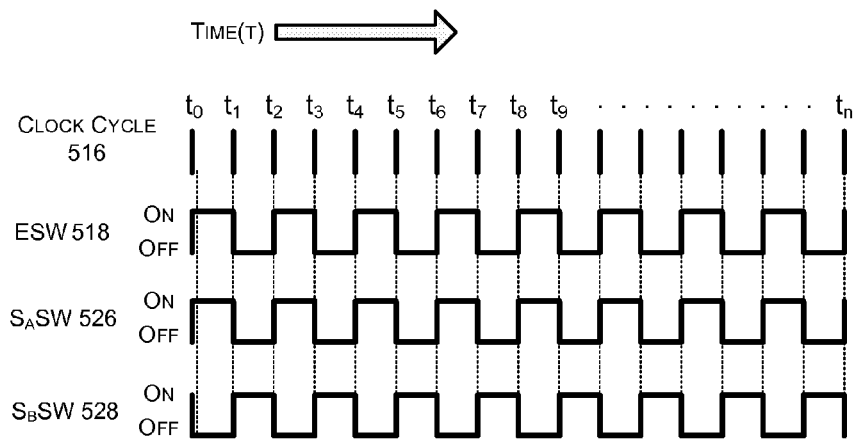

FIG. 5C shows the clock cycle 516, the ESW 518, and graphs depicting functionality of the light sensors 108 (i.e., the storage element A 512 and the storage element B 514) plotted with respect to time (t). In accordance with various embodiments, the storage element A 512 and the storage element B 514 may operate in synchronization with the clock cycle 516, and thus in synchronization with the ESW 518. In addition, the storage element A 512 may operate in opposite alternation (inverse synchronization) with the storage element B 514. Thus, when storage element A 512 is available to store energy from captured light, then storage element B 514 may be unavailable to store energy, and vice versa. A storage element A square wave ($S_ASW$) 526 shows an on-state and an off-state of the storage element A, where the storage element A and B are able to store energy when in the on-state and unable to store energy (e.g., off, blocked, disconnected, etc.) when in the off-state. The $S_ASW$) 526 may be synchronized to operate during the time intervals with the light emitter 106 (e.g., synchronized with the ESW 518, but not necessarily the same as the ESW). A storage element B square wave ($S_BSW$) 528 shows an on-state and an off-state of the storage element B, which is inversely synchronized with the $S_ASW$ 526. The storage element A and B may be capacitors that receive a charge when light is captured by the photodiode 510 (i.e., the reflected light 508) during the on-state. The capacitors may be discharged after each modulation period or at other intervals (e.g., prior to oversaturation as discussed with reference to FIGS. 12 and 13). In various embodiments, additional storage elements may be employed in addition to the storage element A and B. In some embodiments, the storage element A and B may be implemented as separate sensors each having a photodiode that captures light in multiple time intervals (e.g., interval A and interval B), and so forth.

Figure 5D:
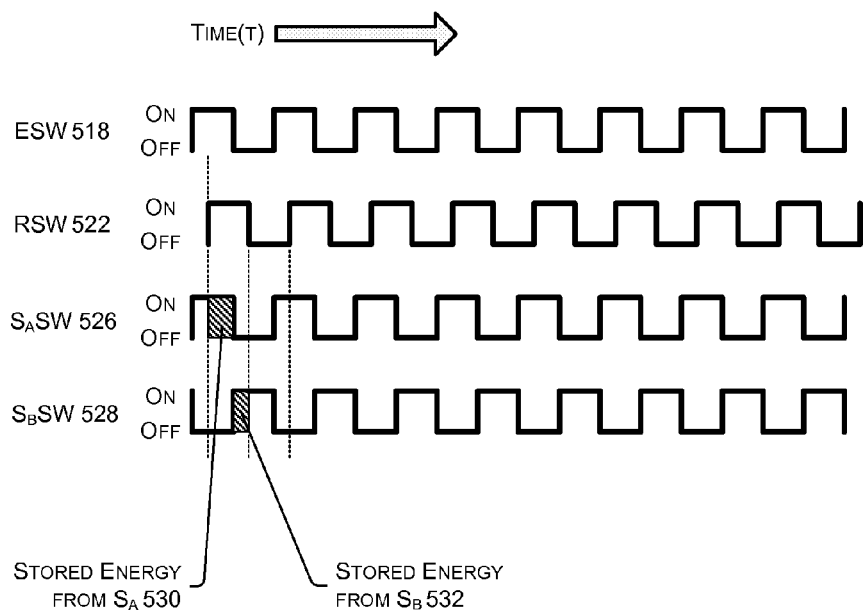

FIG. 5D shows the square waves discussed with reference to FIGS. 5B and 5C during an example plot of time-of-flight of pulses of light. When the $S_A$SW 526 is in the on-state and light is received by the light sensor(s) 108 (shown by the RSW 522), then the storage element A 512 may store energy from captured light such that an amount of light captured by the photodiode 510 can be measured during the on-state of the storage element A (e.g., by charging a capacitor, etc.). The amount of energy stored during this cycle of storage element A is shown as stored energy from storage element A ($SES_A$) 530. When the storage element A is in the off-state, the storage element A no longer stores energy, and thus the $SES_A$ 530 has achieved a maximum value during this modulation period. As discussed above, the storage element B 514 may transition to the on-state when the storage element A transitions to the off-state. When the $S_B$SW 528 is in the on-state and light is received by the light sensor(s) 108, then the storage element B 514 may store energy such that an amount of stored energy can be measured during the on-state of the storage element B (e.g., by charging a capacitor, etc.). The amount of energy stored during this cycle of storage element B is stored energy from storage element A ($SES_B$) 532. When the storage element B is in the off-state, the storage element B no longer stores energy, and thus the $SES_B$ 532 has achieved a maximum value during this modulation period.

Since light travels at a known velocity, a ratio of the $SES_A$ 530 and $SES_B$ 532 provides a linear plot, and thus allows calculation of a distance between the surface 506 and the ARFN 102 (or other known position) when the distance is within a predetermined range. The predetermined range is equivalent to the amount of time of the pulse of light (i.e., the on-state) from the light emitter 106 multiplied by the speed of light (approximately 300,000 km/s). For example, when the pulse is 0.5 µs, then the predetermined range is 150 meters. Thus, the ratio of the $SES_A$ 530 and $SES_B$ 532 enables determination of distances within a known 150 meter range in this example. Outside of this range, the ratio of $SES_A$ 530 and $SES_B$ 532 may correspond to different distances which have the same ratio value, such as distances of 75 meters and 225 meters in this example, both having ratios of 50:50 or one-half the predetermined distance. This creates an aliasing problem, which can be addressed in part by use of at least a third storage element or light sensor (i.e., to create another time interval) as discussed below with reference to FIGS. 7-9.

Figure 6:
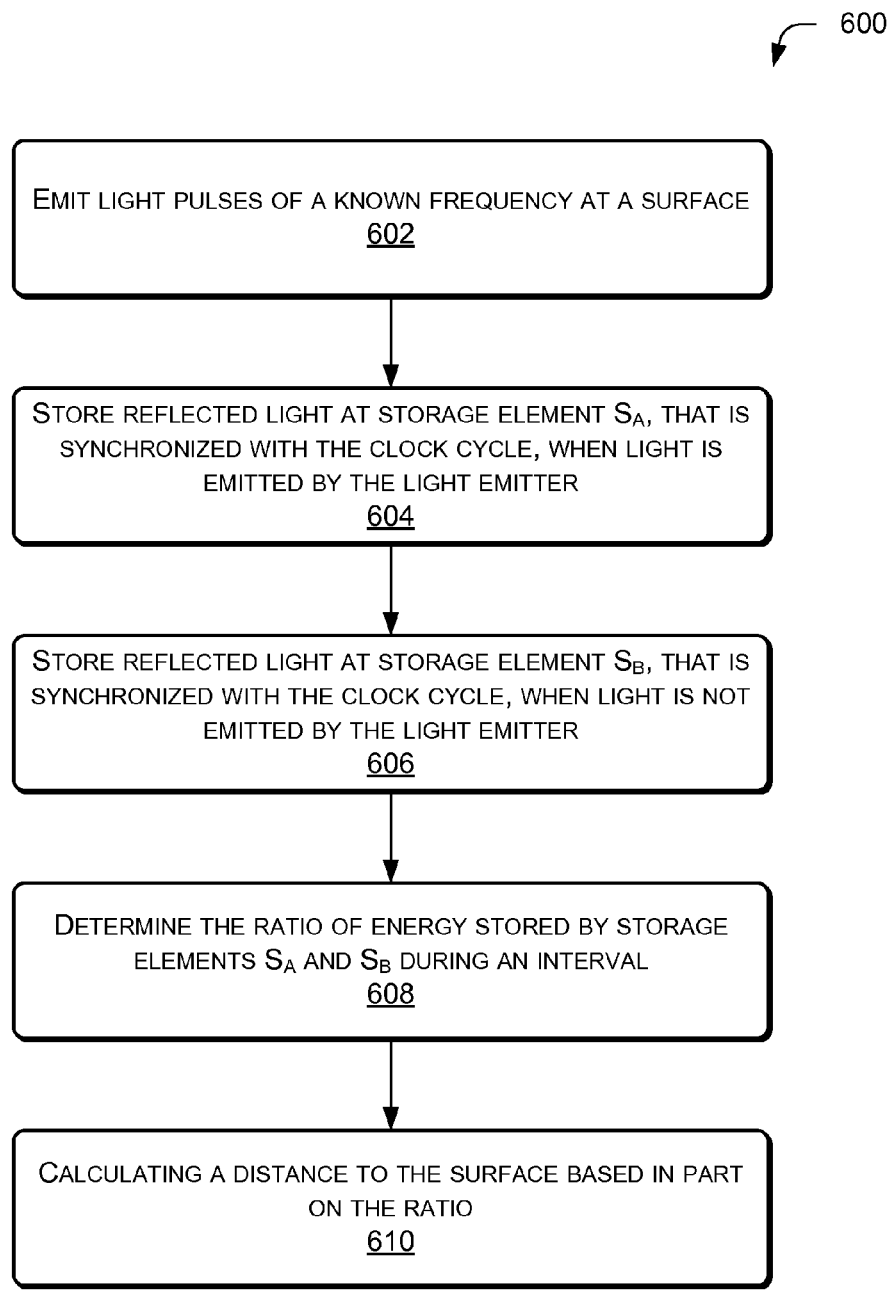
FIG. 6 illustrates a flow diagram of an illustrative process to calculate a distance using a ratio of light captured by various sensors or storage elements.

FIG. 6 illustrates an example flow diagram 600 of a process to calculate a distance using the ratio of light captured by various sensors or storage elements.

At 602, light pulses of a known frequency are emitted at a surface. The frequency may be synchronized with a clock cycle and may have equal lengths of time of emission of light and no emission of light (e.g., on/off). The light pulses may be represented by a square wave as shown in FIGS. 5B-5D; however, other waveforms may be used. The selection of the frequency determines the predetermined range of distances that can be determined using the ratio as discussed here. The selection of the frequency may also determine an accuracy of the measurements, and thus accuracy of the distance calculations. Distances outside of this range may have a same ratio when using two sensors or storage elements (e.g., $S_A$, $S_B$), and thus provide a duplication or aliasing effect.

At 604, reflected light is captured by the photodiode 510 and stored by the storage element A 512 when the storage element A is in the on-state and is able to store energy. The storage element A 512 may be synchronized with the clock cycle, and thus may store energy when the light emitter emits light in the on-state.

At 606, reflected light is captured by the photodiode 510 and stored by the storage element B 514 when the storage element B is in the on-state and is able to store energy. The storage element B 514 may operate in an opposite alternation with the storage element A, thus storage element B 514 may be operating in the on-state when the storage element A 512 is operating in the off-state. Therefore, the storage element B 514 may be inversely synchronized with the storage element A 512.

At 608, a ratio is determined for the amount of energy stored by the storage element A 512 ($SES_A$ 530) and the amount of energy stored by the storage element B 514 ($SES_B$ 532) during a modulation period or other interval of time.

At 610, a distance between the surface that reflects the light and the ARFN 102 is calculated based in part on the ratio, the predetermined frequency of the pulses of light, and the speed of light. As discussed above, the distance may need to be within a predetermined range to avoid a duplication or aliasing effect.

Figure 7:
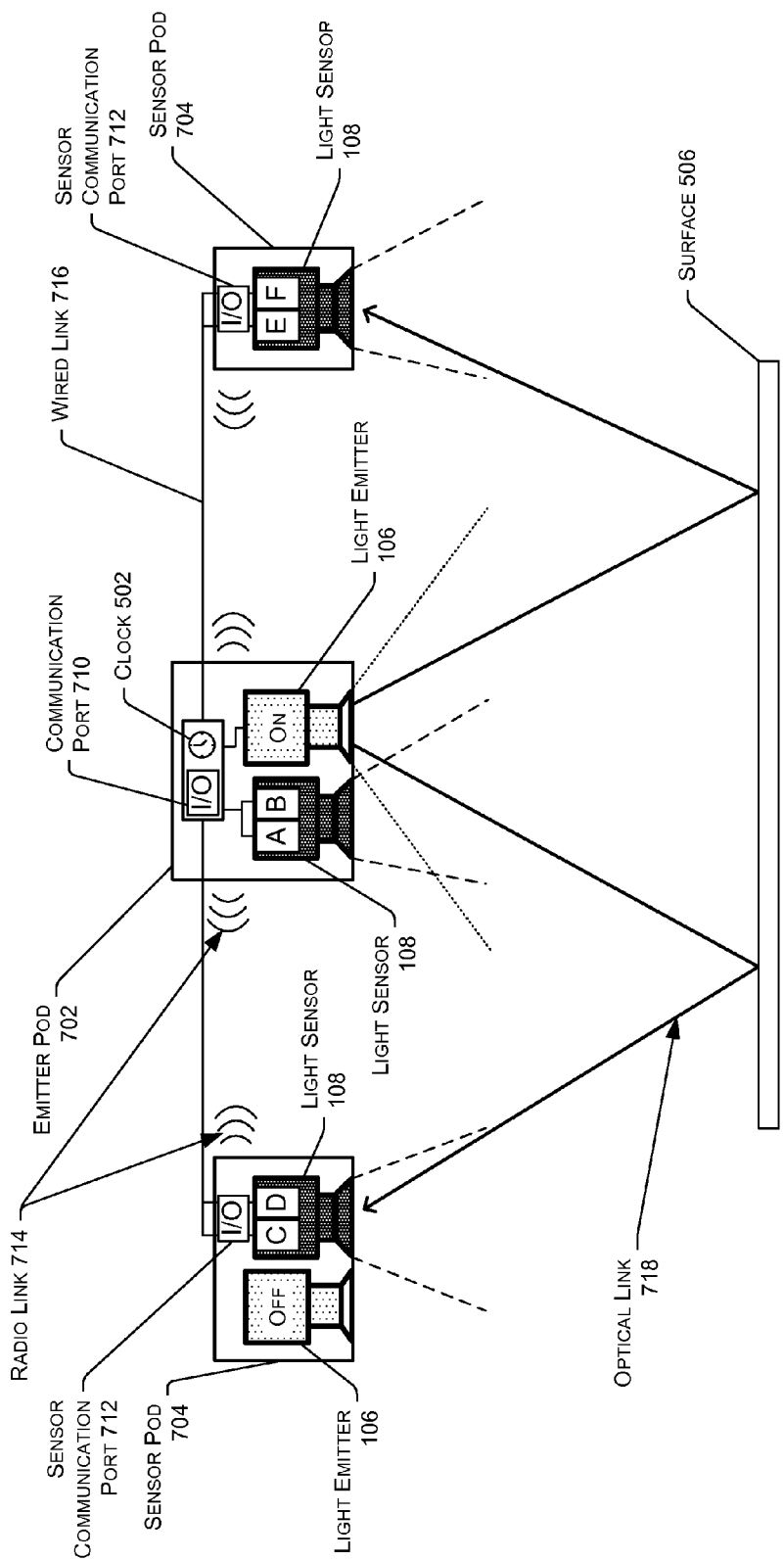
FIG. 7 illustrates an example environment that includes an emitter pod and sensor pod(s) that capture light emitted from the emitter pod. The environment shows various types of possible communications between the emitter pod and sensor pod(s).

FIG. 7 illustrates an example environment 700 that includes an emitter pod 702 (e.g., the ARFN 102) and sensor pod(s) 704 that capture light emitted from the emitter pod. The emitter pod 702 may also be referred to herein as an emitter unit while the sensor pod 704 may also be referred to herein as an emitter unit. As discussed herein, the emitter pod 702 includes the light emitter 106 that is currently emitting light (e.g., active, on, etc.) while the sensor pods include at least one of the light sensors 108 synchronized to operate during the time intervals with the light emitter 106. Although only three light sensors are shown, the environment 700 may include more or fewer light sensors. In some embodiments, the sensor pods 704 may include light emitters that are not currently emitting light (e.g., inactive, off, etc.). However, the role of the pods may alternate as explained with reference to at least FIG. 10A-C.

In some embodiments, the emitter pod 702 may include at least one of the light sensors 108. The emitter pod 702 may perform at least some of the ToF distance calculations using the light emitter 106 as described above with reference to FIGS. 5A-5D. For example, the emitter pod 702 may be equipped with one or more processors to perform the calculations.

The emitter pod 702 may include the clock 502 that creates the clock cycle for synchronization purposes and/or other purposes as described previously. The emitter pod may not necessarily include a light sensor. In some embodiments, the light sensors 108 may be located exclusively or non-exclusively in the sensor pods and distributed or dispersed within the environment 700. For example, as shown in FIG. 1, a room may include various sensor pods and a single emitter pod (each referred to as ARFNs in the environment 100).

In various embodiments, the emitter pod 702 may include an emitter pod communication port 710 (or input/output (I/O) port) to enable communications with each sensor pod through a sensor communication port 712. The emitter pod communication port 710 and the sensor communication port 712 may be used to exchange data between the emitter pod 702 and the sensor pod 704.

As discussed above, the sensor pods 704 include at least one sensor synchronized to operate during the time intervals with the light emitter 106. The environment 700 shows various types of possible links between the emitter pod and sensor pod(s) which may provide a synchronization signal to provide or facilitate the synchronization causing operation of devices during a same set of time intervals. Some of the communications may be performed using the emitter pod communication port 710 and sensor communication port 712.

In various embodiments, the emitter pod 702 may exchange data with the sensor pod 704 using a radio link 714 (e.g., wireless link). The radio link 714 may use any known radio transmission protocol, such as Wi-Fi, Bluetooth®, or other types of sound-based communication protocols. When the radio link 714 is used, the emitter pod communication port 710 and the sensor communication port 712 may include transceivers to enable communication via the radio link 714. The radio link 714 may be used to initiate synchronization between the light emitter and the light sensors as described above. In some instances, the synchronization may be performed, in part, using data output from the clock 502.

In some embodiments, the emitter pod 702 may exchange data with the sensor pod 704 using a wired link 716. The wired link 716 may include any type of wired connection (i.e., physical connection) between the emitter pod 702 and the sensor pods 704. The wired link 716 may be used to initiate synchronization between the light emitter and the light sensors as described above. In some instance, the synchronization may be performed, in part, using data output from the clock 502.

In accordance with one or more embodiments, the emitter pod 702 may exchange data with the sensor pod 704 using an optical link 718. The optical link 718 may use the light emitter 106 and the light sensors 108. In some instances, the sensor pods 704 may be equipped with a light emitter to emit optical signals for receipt by the emitter pod 702. However, the sensor pods 704 may also communicate with the emitter pod 702 using at least one of the other links discussed above. The optical link 718 may involve bouncing light off the surface 506. When the surface 506 has a known distance, the optical link 718 may be used to synchronize operation of the sensor pods 704. In some configurations, the emitter pod 702 may emit light directly to the sensor pod 704 (e.g., without reflecting the light off the surface 506). Thus, the optical link 718 may or may not require redirection of light off the surface 506. The optical link 718 may be used to initiate synchronization between the light emitter and the light sensors as described above. In some instance, the synchronization may be performed, in part, using data output from the clock 502.

In some embodiments, a combination of the various networks discussed above may be used to facilitate communication between the emitter pod 702 and the sensor pod(s) 704 and/or possibly between two or more of the sensor pods.

Figure 8:
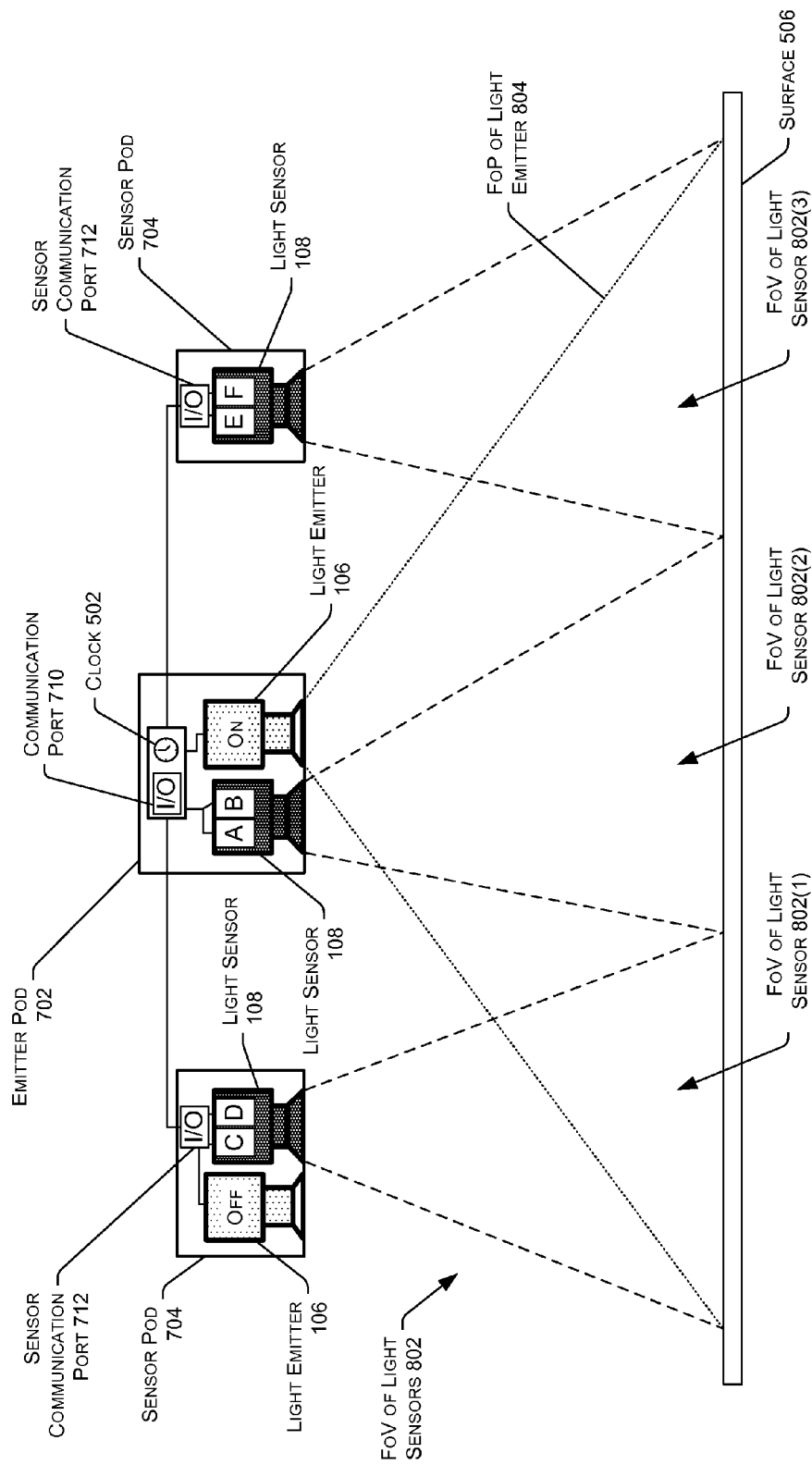
FIG. 8 illustrates use of the sensor pod(s) to increase resolution of ToF calculations across a surface area.

FIG. 8 illustrates use of the sensor pod(s) to increase resolution of ToF calculations across a surface area using an environment similar to that shown in the environment 700. Each of the sensor pods 704 includes one of the light sensors 108 having a field-of-view (FoV) 802. The FoV is determined by an angle by which each light sensor receives light, which results in an amount of surface area of the surface 506 that is viewable by the corresponding light sensor. The FoV 802 may be modified, selected, or adjusted optically (e.g., using different lenses) or digitally (e.g., digital editing, etc.).

As shown in FIG. 8, each of the light sensors has a FoV 802(1), 802(2), and 802(3). The FoV 802 may be selected such that the surface area of the surface 506 is viewable by at least one of the light sensors while minimizing overlap of the FoV from different light sensors. By minimizing the overlap (or having no overlap), the light emitters may capture a higher resolution of data regarding a ToF of light emitted by the light emitter 106 and reflected by the surface 506 as reflected light that is captured by the light sensor. This may allow fabrication of smaller sensor chips used by the light sensors, which can then be distributed or located in different places within an environment (e.g., a room, etc.) and used to capture light from different locations. Thus, the configuration shown in FIG. 8 may provide a higher resolution of data than a configuration that only uses one light sensor of a same type that has a FoV similar to a field-of-projection (FoP) 804 of the light emitter 106.

Figure 9:
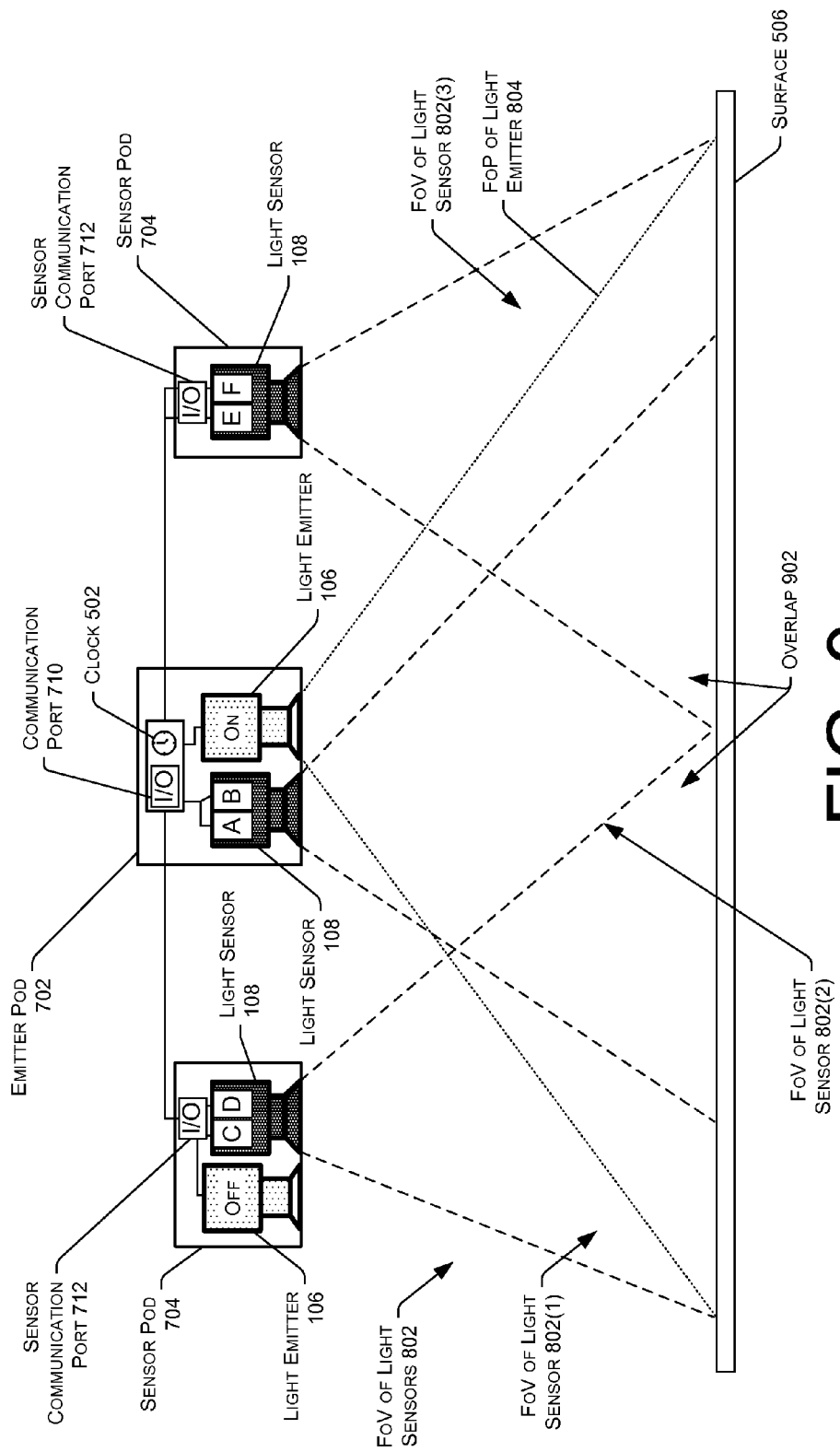
FIG. 9 illustrates use of the sensor pod(s) to reduce noise in ToF calculations across a surface area.

FIG. 9 illustrates use of the sensor pod(s) to reduce noise in ToF calculations across a surface area. The configuration of the emitter pod 702 and the sensor pods 704 may be similar or the same as the configuration shown in FIG. 8. However, the light sensors 108 include a FoV 802 that creates an overlap 902 on the surface 506. The overlap 902 may be used to reduce noise in the data using statistical processing. In some instances, a process may remove outlier data from the overlapped area to thereby remove noise in the data to provide more accurate determinations of the distances. In some embodiments, the overlap may also be used to increase resolution of the data within the overlap 902.

Figure 10B:
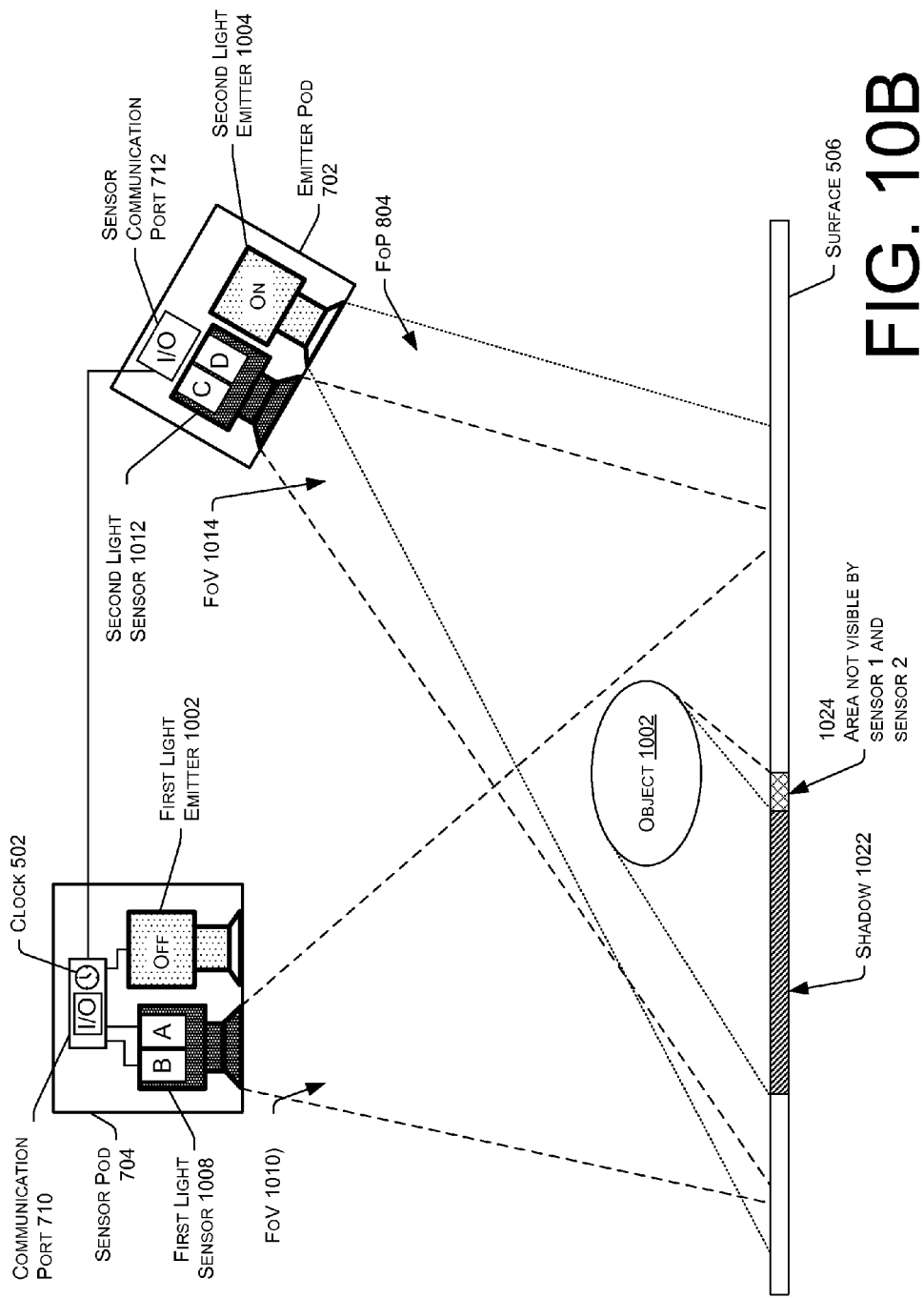

FIGS. 10A-C illustrate use of the sensor pod(s) to provide ToF calculations of objects from various perspectives. FIG. 10A shows use of a first light emitter 1002, FIG. 10B shows use of a second light emitter 1004 after a transition from the use of first light emitter, and FIG. 10C shows a resultant surface coverage detected by the configurations shown in FIGS. 10A and 10B.

As shown in FIG. 10A, the first light emitter 1002 is on and emits pulses of light while the second light emitter 1004 is off and does not emit light. The first light emitter 1002, meanwhile, creates the FoP 804 that may result in emission of light on an object 1006 and the surface 506. A first light sensor 1008 in the emitter pod 702 (or possibly separate from the emitter pod) may have a FoV 1010 while a second light sensor 1012 in the sensor pod 704 may have a FoV 1014.

Because of the shape and location of the object 1006, the surface 506 includes a shadow 1016 because the object 1006 blocks some of the light emitted by the first light emitter 1002. In addition, the object 1006 also blocks some of the surface 506 from view by the first light sensor. An area 1018 of the surface 506 is visible by the second light sensor 1012 but not the first light sensor 1008. Similarly, an area 1020 of the surface 506 is visible by the first light sensor 1008 but not the second light sensor 1012.

The location and angles of the first light emitter 1002, the first light sensor 1008, the second light sensor 1012, and any other light sensors may enable deriving depth information of the object 1006 and the surface 506 and/or filling in distance information on surfaces (e.g., the surface 506, etc.) that may be blocked from view by intermediate surfaces (e.g., the object 1006, etc.) for a particular light sensor (i.e., the areas 1018 and 1020). Thus, the use of one or more sensor pods 704 may enable use of ToF data to determine depth of objects and/or to determine depth of surfaces that may be partially blocked by intermediate surfaces.

In FIG. 10B, the second light emitter 1004 emits pulses of light and is on (active), while the first light emitter 1002 is off (inactive). Because the light emitter is now the second light emitter 1004, the pod associated with the second light emitter is referred to as the emitter pod 702 while the pod associated with the first light emitter is referred to as the sensor pod 704 with respect to FIG. 10B.

Because of the shape and location of the object 1006, the surface 506 includes a shadow 1022 because the object 1006 blocks some of the light emitted by the second light emitter 1004. In addition, the object 1006 also blocks some of the surface 506 from view by the both the first light sensor 1008 and the second light sensor 1012. An area 1024 of the surface 506 is not visible by either the first light sensor 1008 or the second light sensor 1012.

The location and angles of the second light emitter 1004, the first light sensor 1008, the second light sensor 1012, and any other light sensors may enable deriving depth information of the object 1006 and the surface 506 and/or filling in distance information on surfaces (e.g., the surface 506, etc.) that may be blocked from view by intermediate surfaces (e.g., the object 1006, etc.) for a particular light sensor (i.e., the area 1024). Thus, the use of one or more sensor pods 704 may enable use of ToF data to determine depth of objects and/or to determine depth of surfaces that may be partially blocked by intermediate surfaces.

FIG. 10C shows a persistent shadow 1026 which is an area of overlap between the shadow 1016 shown in FIG. 10A and the shadow 1022 shown in FIG. 10B. This, even with alternating use of the first light emitter 1002 and the second light emitter 1008, the surface 506 may include the persistent shadow 1026. In addition, due to the location of the first light sensor 1008 and the second light sensor 1012, an area 1028 of the surface may be blocked from view by the light sensors, and thus include a persistent omission of data about a distance of this portion of the surface 506. Deployment of additional light emitters and light sensors may be used to minimize or remove persistent shadows and/or persistent omissions caused by the intermediate objects (e.g., the object 1006, etc.).

Figure 11:
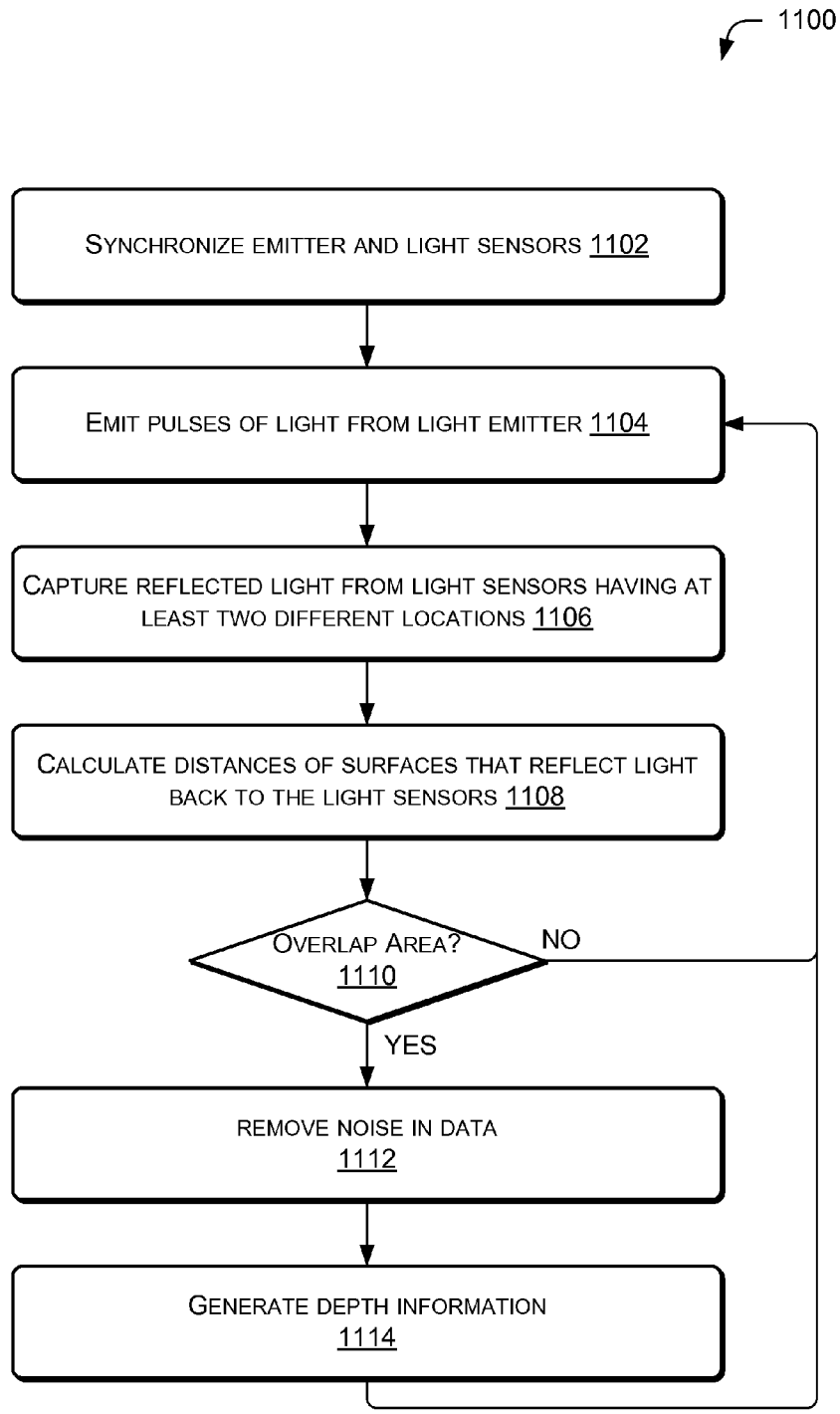
FIG. 11 is a flow diagram of an illustrative process to perform ToF calculations using an emitter pod and one or more sensor pods.

FIG. 11 is a flow diagram of an illustrative process 1100 to perform ToF calculations using the emitter pod 702 and one or more sensor pods 704.

At 1102, the sensor pods 704 may synchronize with the emitter pod 702 to enable ToF distance calculations using light captured by the light sensors in the sensor pods 704. For example, the synchronization may use a clock to synchronize the on-state and off-state of the light sensors as described with reference to the FIGS. 5A-5D.

At 1104, pulses of light are emitted by the light emitter 106 in the emitter pod 702 and reflected off a surface before being captured by each of the light sensors.

At 1106, the reflected light may be captured by light sensors having at least two different locations. For example, the light sensor may be located in different sensor pods which are arranged within a room or other environment.

At 1108, one or more processors may calculate distances of surfaces that reflect the pulses of light back to the light sensors. The one or more processors may use known location information of the light emitter 106 and the light sensors 108 within the room or environment when performing the calculations. The one or more processors may be included in the emitter pod 702 or distributed across multiple pods, such as being included in each of the sensor pods 704.

At 1110, the one or more processors may determine whether the overlap 902 exists where the FoV of two or more sensors overlaps on a surface. When the overlap exists (following the "yes" route from the decision operation 1110), then the process 1100 may proceed to an operation 1112 and/or an operation 1114. However, when no overlap exists, the process 1100 may proceed to the operation 1104 and continue to loop.

At 1112, the one or more processors may remove noise from the data with the overlap. In various embodiments, outlier data may be removed from the overlapped area, which in turn may reduce noise in the data and provide more accurate determinations of the distances. For example, the one or more processors may use mean data values and/or other statistical analysis to remove invalid or other outlier data from results determined in the operation 1108, and thereby provide more accurate distance information for the overlap area based on the ToF data from two or more of the light sensors.

At 1114, the one or more processors may generate depth information for objects in the FoV of the overlap 902. For example, the distance information determined from data captured by a first light sensor may be combined with data captured by a second light sensor to map the overlap 902 and thereby create depth information of an object. The process 1100 may proceed to the operation 1104 and continue to loop.

Figure 12:
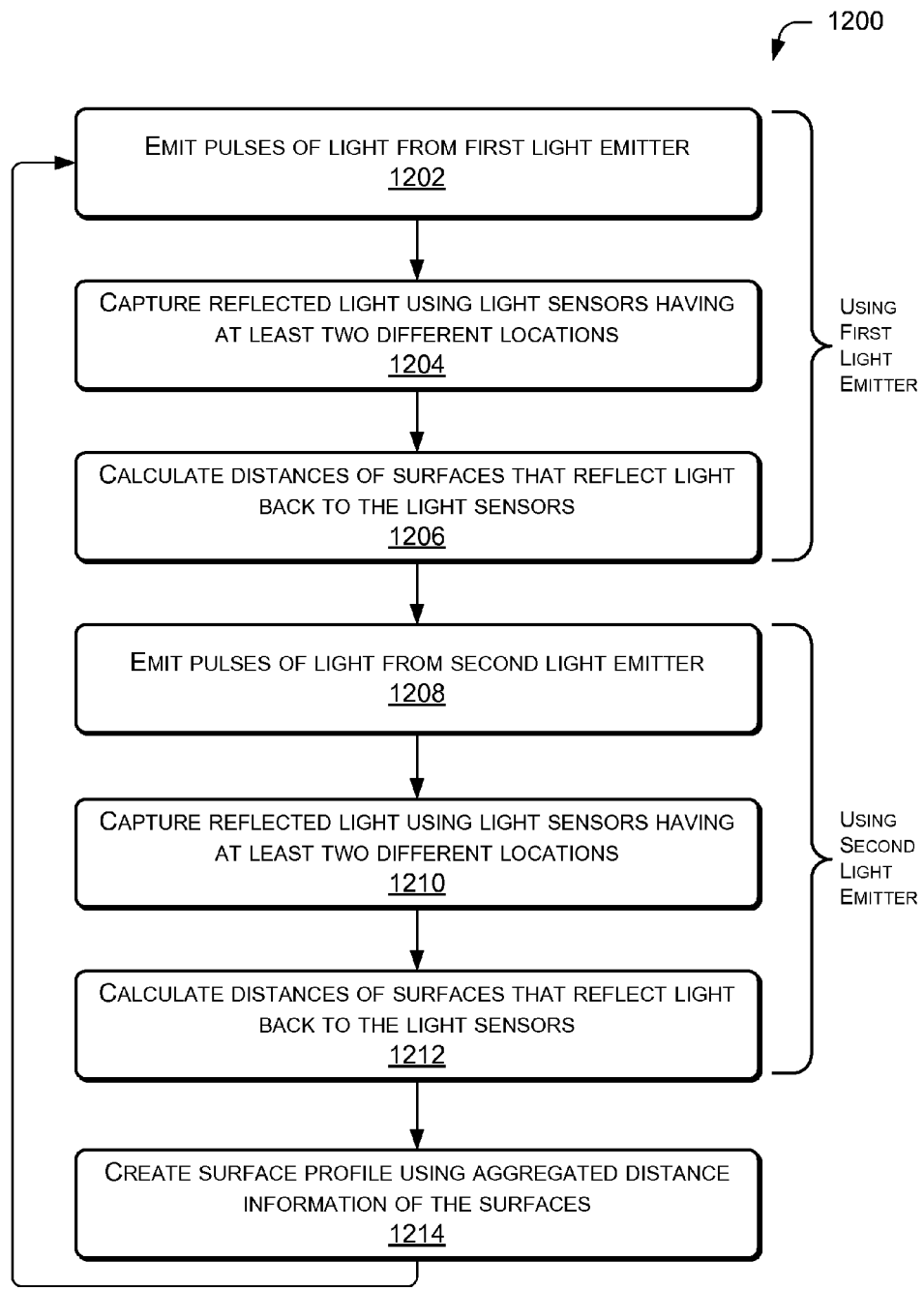
FIG. 12 is a flow diagram of an illustrative process to perform ToF calculations while alternating between use of at least two different light emitters.

FIG. 12 is a flow diagram of an illustrative process 1200 to perform ToF calculations while alternating between use of at least two different light emitters. The process 1200 is described with reference to FIGS. 10A and 10B.

At 1202, the first light emitter 1002 may emit pulses of light which are reflected off a surface and received by multiple light sensors, such as the first light sensor 1008 and the second light sensor 1012.

At 1204, the light sensors may capture reflected light using the multiple light sensors.

At 1206, the processor(s) 114 may calculate distances of surfaces that reflect light back to the light sensors.

The operations 1202, 1204, and 1206 may be performed while the first light emitter 1002 emits the pulses of light (e.g., as shown in FIG. 10A). After operation 1206, the first light emitter 1002 may become inactive and the second light emitter may become active (on). Operations 1208, 1210, and 1212 may be performed while the second light emitter 1002 emits the pulses of light (e.g., as shown in FIG. 10B).

At 1208, the second light emitter 1008 may emit pulses of light which are reflected off a surface and received by multiple light sensors, such as the first light sensor 1008 and the second light sensor 1012.

At 1210, the light sensors may capture reflected light using the multiple light sensors.

At 1212, the processor(s) 114 may calculate distances of surfaces that reflect light back to the light sensors.

At 1214, the processor(s) 114 may create a surface profile using aggregated distance information of the surfaces obtained from the calculation performed at the operation 1206 and the operation 1212. The aggregated surface profile may include some persistent shadows (e.g., the persistent shadow 1026) and persistent omissions (e.g., the persistent omission 1028) as shown in FIG. 10C depending on the location of the light emitters and the light sensors.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:
1. A system comprising:
an emitter unit including:
a light emitter to emit light in pulses having predetermined time intervals;
a first light sensor to capture light that is emitted from the light emitter and reflected off a surface;

one or more processors to calculate a first distance between the first light sensor and the surface and a second distance between a second light sensor and the surface based at least in part on a ratio of light captured during two consecutive instances of the time intervals, the one or more processors to create a profile of the surface based at least in part on the first distance and the second distance; and an emitter unit communications port to broadcast a synchronization signal to synchronize the second light sensor with the light emitter to operate during the time intervals, and to receive data indicating a ratio of light captured during the two consecutive instances of the time intervals by the second light sensor; and a sensor unit including:
the second light sensor, located separate from the emitter unit, to capture light that is emitted from the light emitter and reflected off the surface, the second light sensor being synchronized with the light emitter using the synchronization signal to operate during the time intervals; and a sensor communications port to receive the synchronization signal from the emitter unit communications port and to transmit information indicating the ratio of light captured by the second light sensor during the two consecutive instances of the time intervals to the one or more processors using the emitter unit communications port.

2. The system of claim 1, wherein the first light sensor captures light as energy that is stored in two storage devices, each of the storage devices associated with a different one of the two consecutive time intervals, and wherein the ratio is based at least in part on the energy stored during the two consecutive instances of the time intervals.

3. The system of claim 1, wherein the emitter unit includes a clock to generate the synchronization signal, the synchronization signal to synchronize the time intervals across each of the first light sensor, the second light sensor and the light emitter.

4. The system of claim 1, wherein a field of view of the second light sensor is different than a field of view of the first light sensor.

5. The system of claim 1, wherein a field of view of the second light sensor at least partially overlaps a field of view of the first light sensor to create an overlapped portion, and wherein the one or more processors remove outlier data from the overlapped portion.

6. The system as recited in claim 1, wherein the one or more processors create the profile using location information of a group of pixels, the group of pixels including at least a first pixel located at the first distance and a second pixel located at the second distance.

7. One or more computer-readable media storing computer-executable instructions that, when executed by one or more processors, cause the one or more processors to perform acts comprising:
receiving sensor data from a first unit having a light emitter and at least a first light sensor, the sensor data including light captured from the light emitter during time intervals and used to determine a first distance associated with a surface that reflects light emitted by the light emitter, the first distance determined based at least in part on the sensor data received from the first unit;
receiving sensor data from a second unit having at least a second light sensor, the second unit being synchronized with the first unit to operate during the time intervals, the sensor data including light captured from the light emitter during the time intervals and used to determine a second distance associated with the surface that reflects light emitted by the light emitter, the second distance determined based at least in part on the sensor data received from the second unit;
calculating the first distance and the second distance based at least in part on the sensor data from the first unit and the sensor data from the second unit; and
creating a profile of the surface based at least in part on the first distance and the second distance.

8. The one or more computer-readable media storing computer-executable instructions of claim 7, wherein the first and second distances are calculated at least in part using a ratio of light captured during two consecutive instances of the time intervals.

9. The one or more computer-readable media storing computer-executable instructions of claim 7, wherein the sensor data from the first unit corresponds to light reflected from a first portion of the surface and the sensor data from the second unit corresponds to light reflected from a second portion of the surface that is different than the first portion of the surface.

10. The one or more computer-readable media storing computer-executable instructions of claim 7, wherein the sensor data from the first unit corresponds to light reflected from a first portion of the surface and the sensor data from the second unit corresponds to light reflected from a second portion of the surface, wherein the second portion at least partially overlaps the first portion of the surface to create an overlapped portion, and wherein the acts further comprise removing outlier data in the overlapped portion.

11. The one or more computer-readable media storing computer-executable instructions of claim 7, wherein:
the surface is a surface of an object,
the sensor data from the first unit corresponds to light reflected from a first portion of the surface of the object and the sensor data from the second unit corresponds to light reflected from a second portion of the surface of the object, wherein the second portion of the surface of the object includes part of the surface of the object that is different than the first portion of the surface of the object, and
the acts further comprise determining a depth of the object based at least in part on (i) the first distance calculated based at least in part on the light reflected from the first portion of the surface of the object and (ii) the second distance calculated based at least in part on the light reflected from the second portion of the surface of the object.

12. The one or more computer-readable media storing computer-executable instructions of claim 7, wherein the acts further comprise causing synchronization by exchanging a synchronization signal between the second unit and the first unit using at least one of radio communications or optical communications.

13. The one or more computer-readable media storing computer-executable instructions of claim 7, wherein the light emitter is a first light emitter, and wherein the acts further comprise sending commands to the first light emitter and a second light emitter to alternate emission of light between the first light emitter and the second light emitter to cause receipt of sensor data for a portion of the surface otherwise obscured by an object when the object is situated between the first light emitter and the portion of the surface.

14. The one or more computer-readable media storing computer-executable instructions of claim 7, wherein the creating the profile further comprises:

determining a first location of a first pixel based at least in part on the first distance;

determining a second location of a second pixel based at least in part on the first distance; and creating the profile based at least in part on at least the first location of the first pixel and the second location of the second pixel.

15. A system comprising:

an emitter unit including a light emitter and at least a first light sensor synchronized with the light emitter to operate during time intervals, the at least the first light sensor to detect light emitted by the light emitter and reflected from a surface during at least two of the time intervals, the detected light used to calculate a first distance between the at least the first light sensor and the surface;

a sensor unit including at least a second light sensor, synchronized with the light emitter to operate during the time intervals and located separate from the emitter unit, the at least the second light sensor to detect light emitted by the light emitter and reflected from the surface during at least two of the time intervals, the detected light used to calculate a second distance between the at least the second light sensor and the surface; and a processor to create a profile of the surface based at least in part on the first distance and the second distance.

16. The system of claim 15, wherein the emitter unit includes an emitter unit communications port that exchanges data with a sensor communications port included in the sensor unit, the exchanged data to provide synchronization of the time intervals by an exchange of at least one of optical signals or radio waves.

17. The system of claim 15, wherein a field of view of the at least the second light sensor is different than a field of view of the at least the first light sensor.

18. The system of claim 15, wherein a field of view of the at least the second light sensor at least partially overlaps a field of view of the at least the first light sensor to create an overlapped portion, and wherein the emitter unit removes outlier data from the overlapped portion.

19. The system of claim 15, wherein emitter unit uses the first distance and the second distance to track movement of one or more surfaces or one or more objects.

20. The system of claim 15, wherein the light emitter is a first light emitter, and further comprising a second light emitter that emits light in alternation with the first light emitter, the second light emitter to cause illumination of a portion of the object that is not illuminated by the first light emitter, the second light emitter included in the sensor unit and synchronized to operation during the time intervals.

21. The system of claim 15, wherein the processor creates the profile using locations of pixels that are located by at least the first distance and the second distance.

22. A method comprising:

calculating a first distance associated with a surface using sensor data collected by a first unit having a light emitter and at least a first light sensor synchronized with the light emitter to operate during time intervals, the sensor data collected by the first unit indicating measurements of light emitted by the light emitter and reflected off the surface during at least two different intervals of the time intervals;

calculating a second distance associated with the surface using sensor data from a second unit having at least a second light sensor synchronized with the light emitter to operate during the time intervals, the sensor data from the second unit indicating measurements of light emitted by the light emitter and reflected off the surface during the at least two different intervals of the time intervals; and creating a profile of the surface based at least in part on the first distance and the second distance.

23. The method of claim 22, wherein the sensor data from the first unit corresponds to light reflected from a first portion of the surface and the sensor data from the second unit corresponds to light reflected from a second portion of the surface that is different than the first portion of the surface.

24. The method of claim 22, wherein the sensor data from the first unit corresponds to light reflected from a first portion of the surface and the sensor data from the second unit corresponds to light reflected from a second portion of the surface, wherein the second portion at least partially overlaps the first portion of the surface to create an overlapped portion, and further comprising removing outlier data in the overlapped portion.

25. The method of claim 22, wherein:

the surface is a surface of an object, the sensor data from the first unit corresponds to light reflected from a first portion of the surface and the sensor data from the second unit corresponds to light reflected from a second portion of the surface, wherein the second portion of the surface includes part of the surface of the object that is different than the first portion of the surface of the object, and further comprising determining a depth of the object based at least in part on (i) the first distance calculated based at least in part on the light reflected from the first portion of the surface of the object and (ii) the second distance calculated based at least in part on the light reflected from the second portion of the surface of the object.

26. The method of claim 22, wherein the creating the profile further comprises aggregating distance information from a plurality of distances that include at least the first distance and the second distance.

27. The method of claim 26, wherein the profile includes at least one of a persistent shadow or a persistent omission due to orientations of one or more of the light emitter, the first light sensor, or the second light sensor.

* * * * *